US006457569B2

(12) United States Patent
Draper et al.

(10) Patent No.: US 6,457,569 B2
(45) Date of Patent: *Oct. 1, 2002

(54) ROTARY ACTUATED OVERSPEED SAFETY DEVICE

(75) Inventors: James M. Draper, East Hartland, CT (US); Richard E. Kulak, Bristol, CT (US)

(73) Assignee: Otis Elevator Company, Farmington, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/428,023

(22) Filed: Oct. 27, 1999

(51) Int. Cl.$^{7}$ .............................. B60T 8/32; B60T 7/12

(52) U.S. Cl. ........................ 188/180; 188/185; 187/351

(58) Field of Search ................................ 188/184, 185, 188/188, 189, 180; 187/350, 373; 192/105 CD, 105 CE, 103 B, 103 C

(56) References Cited

U.S. PATENT DOCUMENTS 456,652 A * 7/1891 Henkel
1,462,087 A * 7/1923 Hendrickson
2,020,739 A * 11/1935 Porter ........................ 188/185
2,651,388 A * 9/1953 Trowbridge ................. 188/184
2,685,350 A * 8/1954 Falk ........................ 188/82.77
3,080,020 A * 3/1963 Hershey ..................... 188/184
3,367,463 A * 2/1968 Armstrong .................. 192/105
3,576,242 A * 4/1971 Mumma ...................... 193/35
3,768,609 A * 10/1973 Laing ......................... 188/184
3,779,355 A * 12/1973 Okuno ................. 192/105 BA
4,005,771 A * 2/1977 Cappotto et al. ............. 197/64
4,195,721 A * 4/1980 Shea .................. 192/105 CD
4,216,848 A * 8/1980 Shimodaira ................ 188/71.2
4,257,494 A * 3/1981 Frankel ....................... 187/89
4,282,953 A * 8/1981 Lichti et al. ................ 188/189
4,556,155 A * 12/1985 Koppensteiner ............. 187/38
4,582,179 A * 4/1986 Nelson ....................... 188/184
4,644,714 A * 2/1987 Zayas .......................... 52/167
4,662,481 A * 5/1987 Morris et al. ................. 187/77
4,856,623 A * 8/1989 Romig, Jr. .................. 188/180
5,222,578 A * 6/1993 Thorp ......................... 187/19
5,280,828 A * 1/1994 Reynoso et al. ............ 188/184
5,310,022 A * 5/1994 Sheridan et al. .............. 187/89
5,363,942 A * 11/1994 Osada ........................ 187/376
5,377,786 A 1/1995 Nakagawa .................. 187/287
5,503,261 A * 4/1996 Schultz ................ 192/105 CD
5,967,443 A * 10/1999 Green ..................... 242/381.5
6,216,826 B1 * 4/2001 Botzet .................... 188/181 R

FOREIGN PATENT DOCUMENTS

EP 0 499 379 A2 8/1992
EP 0499379 A * 8/1992
GB 1042553 A1 * 9/1966
GB 1042553 9/1966
GB 2045370 * 10/1980
JP 5106658 * 4/1993

* cited by examiner

*Primary Examiner*—Paul N. Dickson
*Assistant Examiner*—Melody M. Burch

(57) ABSTRACT

A rotary actuated overspeed safety device is provided for elevators. The overspeed safety device comprises a pair of pivotally mounted counterweights linked by a pivotally attached coupling rod and a wheel that rollably engages a guide rail. The counterweights are pivotally mounted to the wheel in a parallel plane configuration. Centrifugal force causes the pivotally mounted counterweights to pivot outward toward an actuator as the wheel spins. The overspeed safety device is triggered when the pair of pivotally mounted counterweights engages an actuator. The actuator is a housing that is engagably connected to an elevator safety.

8 Claims, 5 Drawing Sheets

ROTARY ACTUATED OVERSPEED SAFETY DEVICE

TECHNICAL FIELD

The present invention relates to elevator braking systems. More particularly, the present invention relates to a rotary actuator that replaces a conventional elevator governor and maintains the function of the governor. The invention provides the actuation that allows a braking system to prevent the elevator car from overspeeding.

BACKGROUND OF THE INVENTION

Elevator systems generally comprise an elevator car suspended by a rope system including a traction drive. The car is guided along guide rails so that relatively little lateral motion is imparted to the car during use. In passenger elevators, at least, it is conventional to provide a braking system to halt the elevator car in the event of an overspeed condition. Braking systems include actuation devices commonly known as governors.

Most elevators of the prior art employ governors. In such an elevator system, the governor detects an excessive speed of the car and actuates emergency stop devices in the event the car experiences an overspeed condition. Conventional governors include a governor pulley at an upper end of the governor system, a tension sheave at the lower end of the governor system, and an endless governor rope passed around and between the pulley and the sheave and extending substantially throughout the length of the governor system. A part of the governor rope is connected to a safety link that is mounted on the car frame. As the car ascends or descends, the governor rope travels so that the governor pulley is rotated.

In an elevator constructed in this manner, if the car travels at a speed higher than the predetermined speed for any reason, the governor pulley correspondingly rotates at a speed higher than its predetermined speed. As the governor pulley rotates at this higher speed, paired flyweights or flyballs rotating on a spindle are accelerated outwardly by centrifugal force. As the flyweights or flyballs are accelerated outwardly, an overspeed switch is tripped and power is removed from the machine motor, a brake is actuated, and, if further overspeed occurs, a clutching device is activated that will clamp down on the governor rope to activate the safeties. The result is that the elevator is brought to an abrupt, although safe, halt.

If the path of the elevator is very long, a very long governor rope is required. As the rope length increases, both the weight of the rope and the force of inertia produced during acceleration of the rope increase. Consequently, as these things increase, so does the requirement for larger and more powerful equipment to slow down the governor rope. Likewise, larger equipment would require more space.

More modern governing devices omit the stationary governor pulley and rope and fit each elevator car with its own smaller governor. Nakagawa, in U.S. Pat. No. 5,377,786, discloses a governor that includes a rotating member mounted on an elevator car so as to rollably contact the guide rail along which the elevator travels. This rotating member is looped by a belt to an actuator means which actuates the stop mechanism when the rotating speed of the rotating member exceeds a predetermined speed.

SUMMARY OF THE INVENTION

The present invention is drawn to a rotary actuated overspeed safety device for elevators. The rotary actuated overspeed device comprises a pair of pivotally mounted counterweights fixedly attached to a wheel that rollably engages an elevator guide rail. The pair of counterweights is positioned in a parallel planar relationship with the wheel. Centrifugal force causes the pivotally mounted counterweights to pivot outward toward the edge of the wheel as the wheel spins. An elevator safety is triggered when the pivotally mounted counterweights engage a clutch housing that is movably connected to the elevator safety.

A pivotally attached connecting rod may connect the pair of counterweights. This rod causes the counterweights to pivot in unison. One of the counterweights is spring-biased against an application of centrifugal force. Springs of various spring rates can be used to adjust the amount of centrifugal force needed to cause the counterweights to pivot.

The counterweights may be pivotally mounted on a base. This base is preferably positioned in a parallel planar relationship with the wheel and is fixedly connected to the wheel. The base is rotatably supported within the clutch housing by bearings. Bearings may be interposed on the base plate beneath the counterweights to facilitate the pivoting of the counterweights.

The clutch housing is movably connected to an arm that causes the elevator safety to engage when torque is transferred from the moving counterweights to the clutch housing. The clutch housing is dimensioned, configured, and positioned to be engaged by the counterweights when the counterweights pivot outwardly.

The invention also comprises a rotary actuated safety device having a wheel that rollably engages a guide rail, two pairs of pivotally mounted counterweights, and a clutch housing to actuate an elevator safety. This embodiment is substantially the same as the previous embodiment; however, the second pair of counterweights is configured to pivot under an application of centrifugal force caused by overspeed rotation in the opposite direction.

BRIEF DESCRIPTION OF THE DRAWINGS

The present invention will now be described with reference to the accompanying drawings, which are meant to be exemplary, not limiting, and wherein like elements are numbered alike in several figures, in which.

DETAILED DESCRIPTION OF THE PREFERRED EMBODIMENTS

The invention summarized above and defined by the enumerated claims will be better understood by referring to the following detailed description, which should be read in conjunction with the accompanying drawings.

Figure 1:
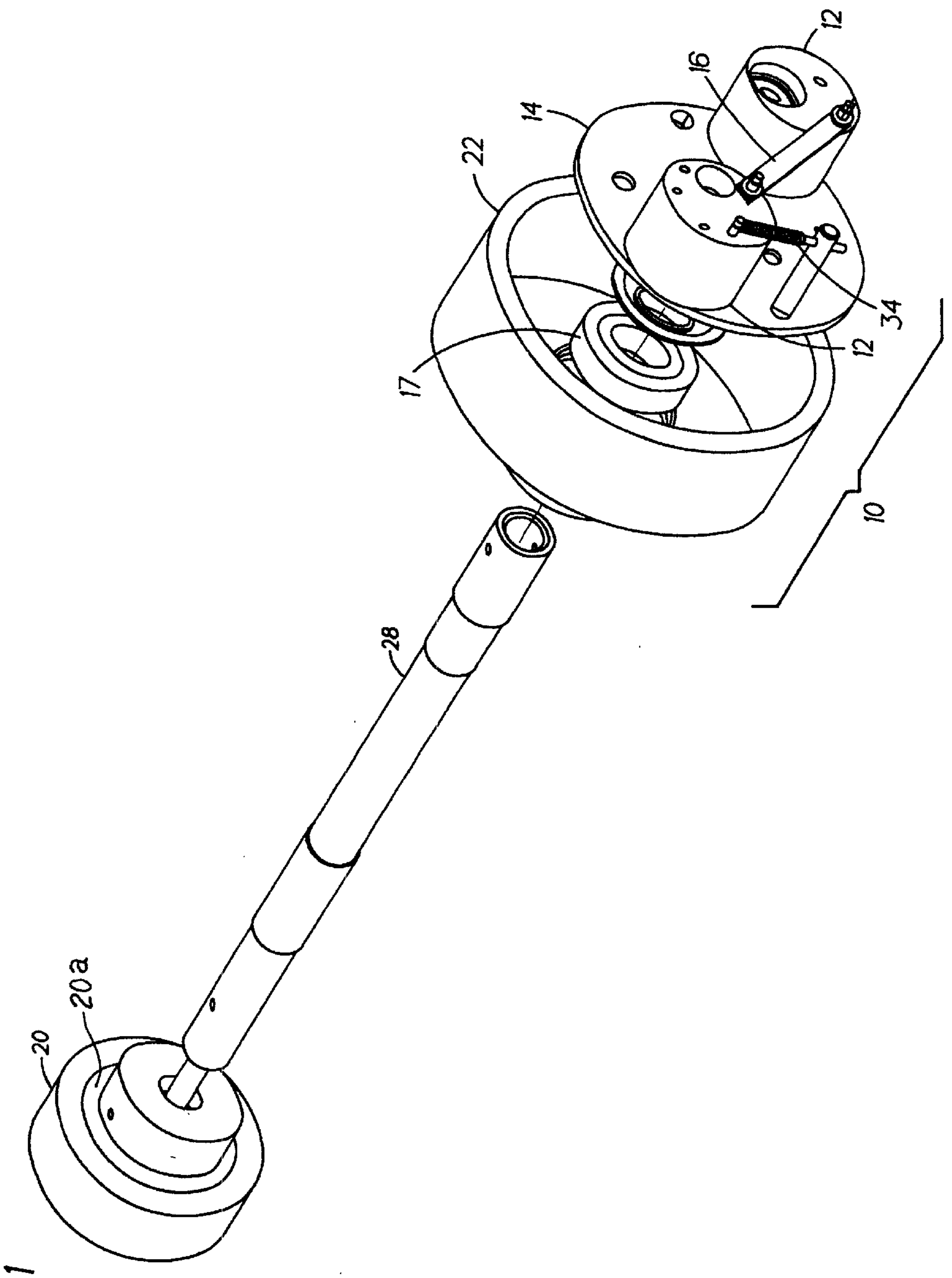
FIG. 1 is an exploded view of the clutch housing, tire, and rotary actuator.

FIG. 1 illustrates a rotary actuator 10. Rotary actuator 10 comprises a pair of counterweights 12 mounted on a base plate 14 and connected together by a coupling rod 16. Base plate 14 is rotatably mounted inside a clutch housing 22 and fixedly attached to an end of a shaft 28. An opposing end of shaft 28 is fixedly mounted to a rotatable tire 20, which is mounted on an outer edge of a wheel 20*a*. Tire 20 rollably engages the nose portion of a T-shaped guide rail.

Figure 2:
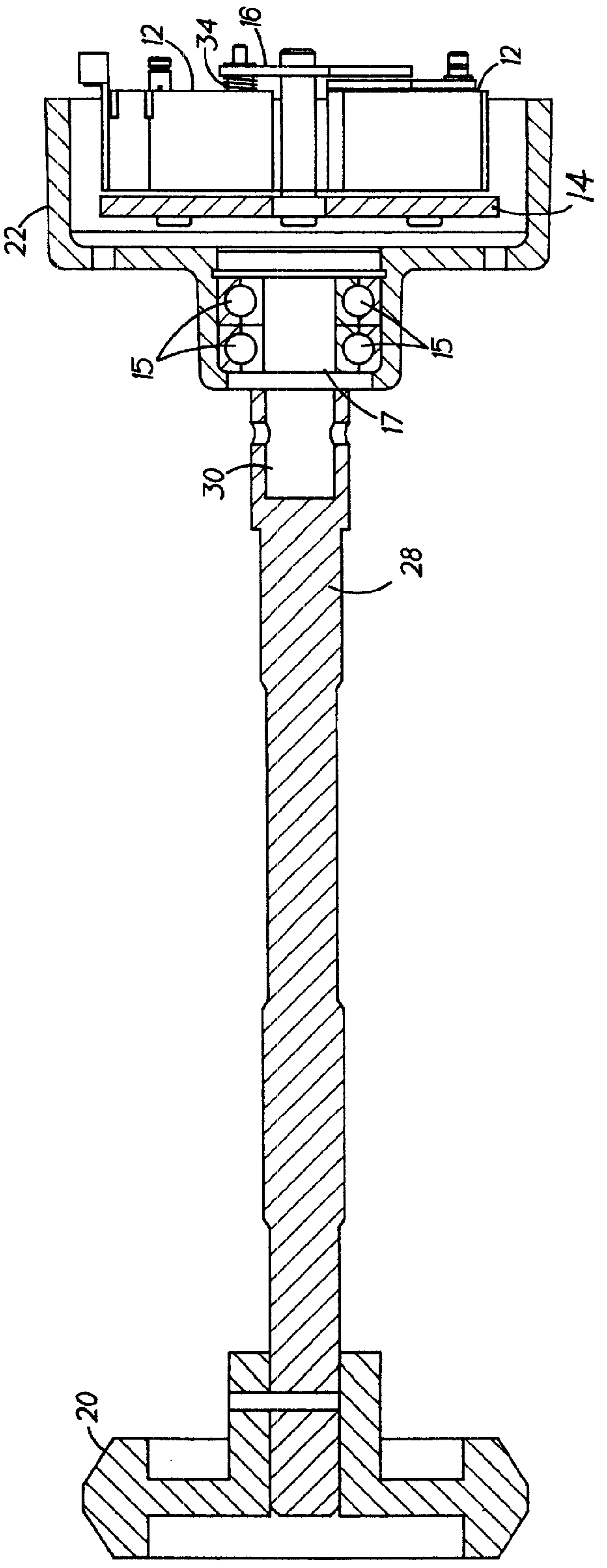
FIG. 2 is a side cutaway view of the clutch housing, the base plate, the bearings supporting the base plate, and the counterweights.

Base plate 14 freely spins inside clutch housing 22, as shown in FIG. 2, providing counterweights 12 are not centrifugally driven into contact with clutch housing 22. Shaft 28 is fixedly attached to base plate 14. Base plate rod 30 is fixedly attached to the back of base plate 14 and is positioned in the space of shaft 28. Bearings 15 are housed inside a bearing housing 17 thus allowing base plate 14 to freely spin inside clutch housing 22. Axial rotation of clutch housing 22 causes an arm (not shown) to activate elevator safeties.

Figure 3:
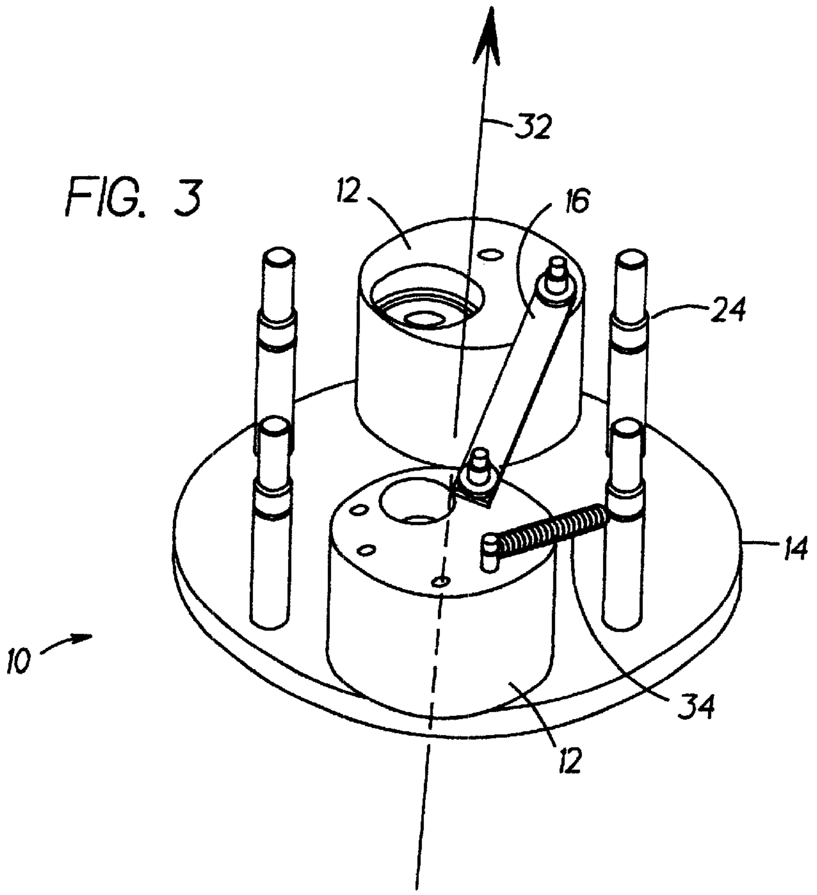
FIG. 3 is an isometric view of the rotary actuator.
Figure 4A:
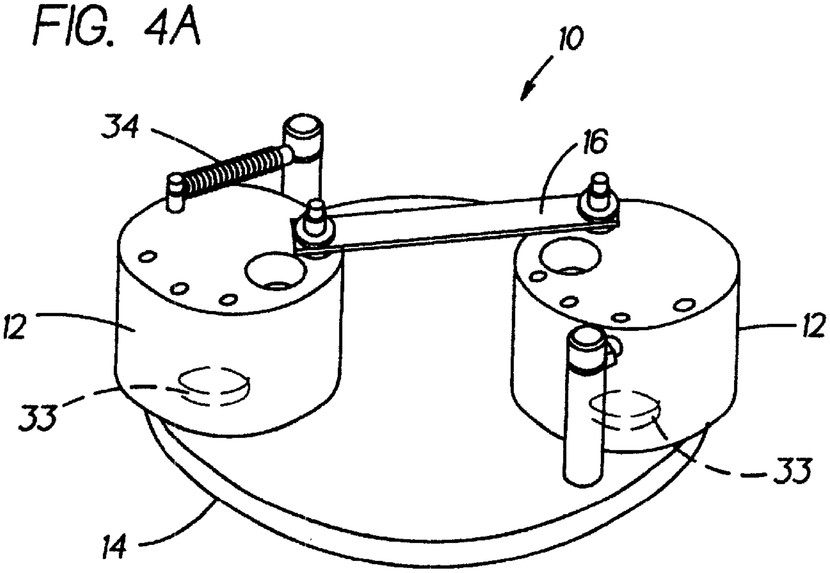
FIG. 4A is an isometric view of an alternate embodiment showing low-friction bearings interposed between the counterweight and the base plate.
Figure 4B:
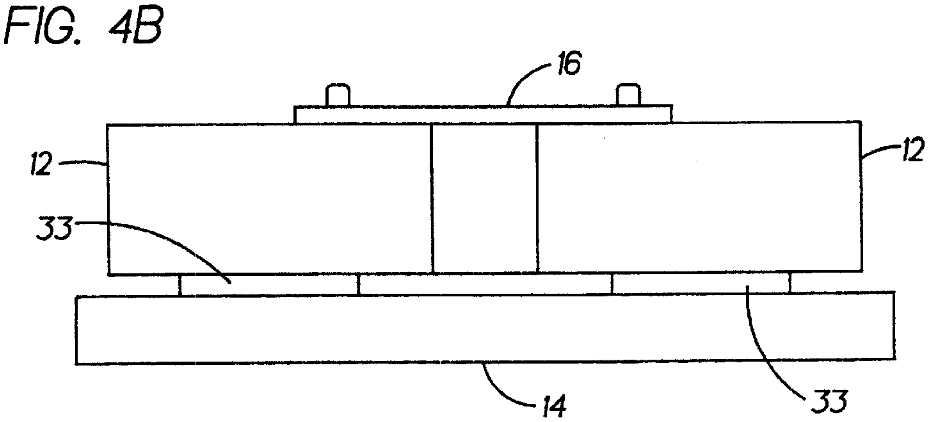
FIG. 4B is a side view of the alternate embodiment showing low-friction bearings interposed between the counterweight and the base plate.

Referring now to FIG. 3, rotary actuator 10 is described in greater detail. Each counterweight 12 is generally cylindrical in shape and dimensioned and configured to fit within clutch housing 22. The surface of counterweight 12 that slides across the surface of base plate 14 is polished to the same smooth finish as the surface of base plate 14 to minimize the frictional resistance during operation of rotary actuator 10. In a preferred embodiment, referring to FIGS. 4A and 4B, low-friction bushings 33 are interposed between base plate 14 and counterweights 12 for improved friction reduction. The preferred material of construction for low-friction bushing 33 is polytetrafluoroethane or a similar material. The sides of counterweights 12 should not be polished, but should instead be of a rougher texture in order to maximize the frictional resistance when counterweights 12 engage a braking surface on the inside of clutch housing 22 during operation of rotary actuator 10. The operation of rotary actuator 10 is described in greater detail below.

Figure 5:
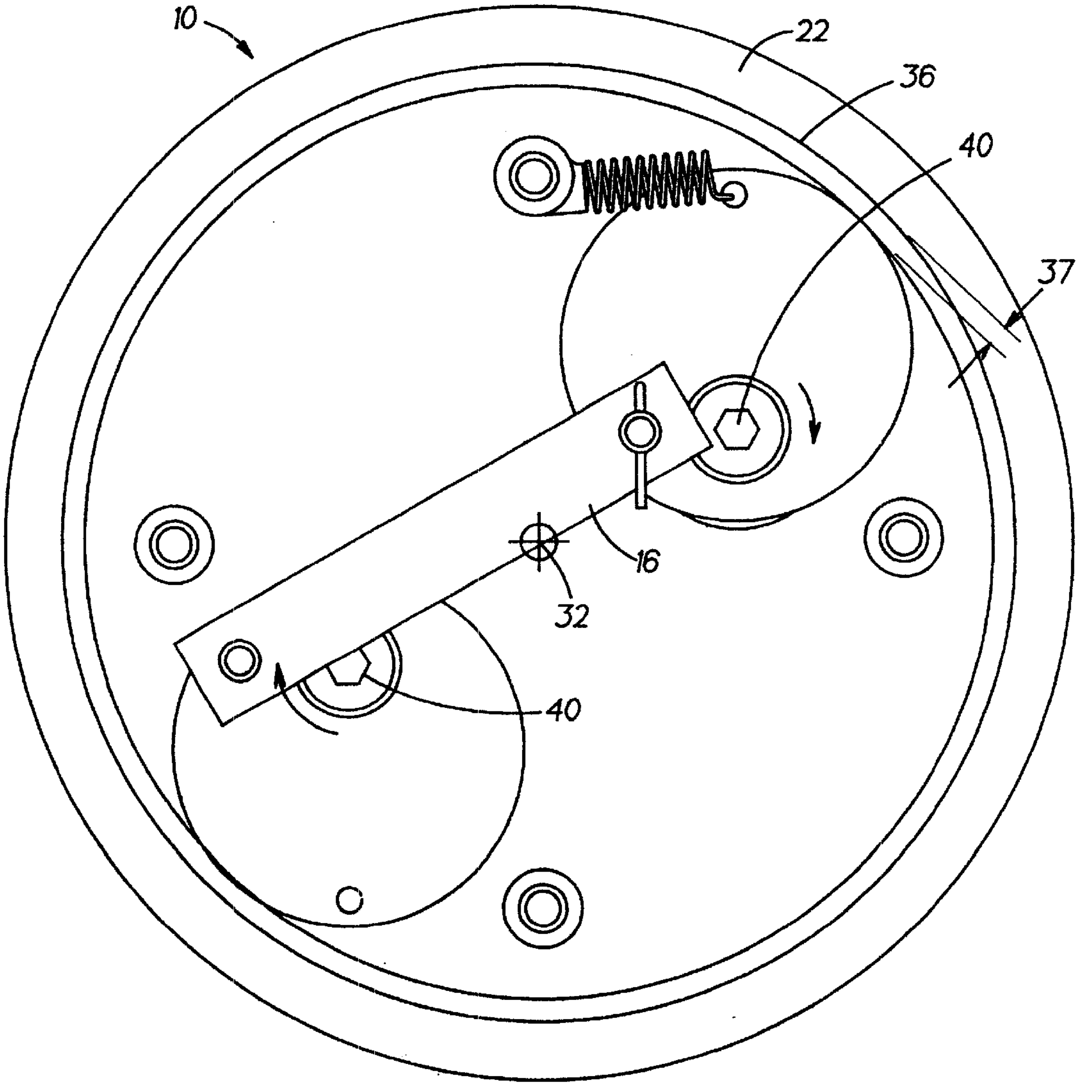
FIG. 5 is a plan view of the rotary actuator.

As illustrated in FIG. 5, counterweights 12 are mounted on diametrically opposing sides of base plate 14. Each counterweight 12 is pivotally mounted to base plate 14 at a point that is not the center of gravity of counterweight 12.

Each end of coupling rod 16 is pivotally connected to a point near the outer edge of the cross sectional area of each counterweight 12. Coupling rod 16 is connected to counterweights 12 in such a manner as to allow pivoting of each counterweight 12 in unison. Furthermore, the distance and travel path of each counterweight 12 is symmetrical with respect to the other. It is preferred that the counterweight 12 and connecting rod 16 assembly be precisely balanced to offset gravitational effects.

A spring 34 is used to hold counterweights 12 in the unactuated position. One end of spring 34 is pivotally attached to one of the counterweights 12 of the pair at a point proximate the outer edge of the counterweight 12. The other end of spring 34 is fixedly attached to base plate 14. Spring 34 has a tension that corresponds to the speed required to trigger rotary actuator 10. In the fully unactuated position, the distance between the outermost edge of counterweight 12 and an inner wall 36 of clutch housing 22 defines a clearance 37.

Figure 6:
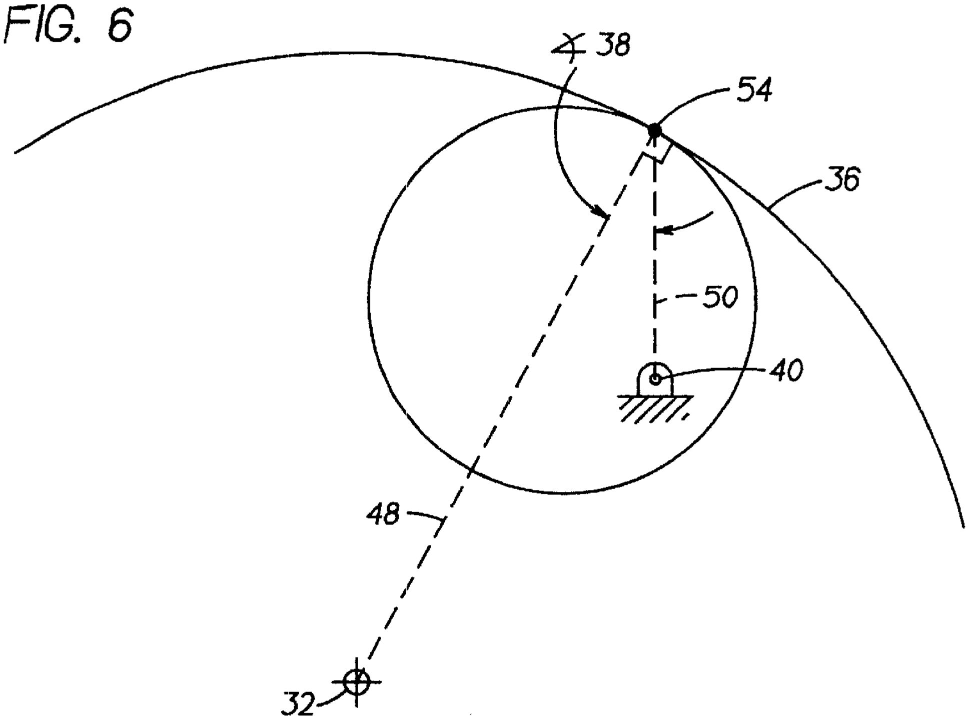
FIG. 6 is a plan view of the counterweight and its contact point with clutch housing.

Operation of rotary actuator 10 is dependent upon the rotational speed of tire 20 along the guide rail. Rotary actuator 10 is triggered by its rotation about an axial center of gravity 32 at such an angular speed that spring 34 extends and counterweights 12 pivot eccentrically outward in unison from their respective pivot points 40 to simultaneously engage inner wall 36 of clutch housing 22. Referring now to FIG. 6, a first line 48 passes through a contact point 54 of counterweight 12 with inner wall 36 of clutch housing 22 and extends to axial center of gravity 32 of actuator 10. A second line 50 passes through the same contact point 54 and extends to a pivot point 40. First line 48 and second line 50 define an angle 38 that causes counterweights 12 to "wedge" against inner wall 36 of clutch housing 22 and remain engaged against inner wall 36.

Rotary actuator 10 rotates at some angular velocity about axial center of gravity 32. As counterweights 12 pivot and engage inner wall 36 of clutch housing 22, torque is transferred to clutch housing 22 as a result of the angular velocity and the load on tire 20. The transfer of torque to clutch housing 22 in turn triggers engagement of the elevator safeties through a connector (not shown), thereby causing the elevator car to come to a halt.

In order to disengage the elevator safeties, once they are engaged as a result of rotary actuator 10 being triggered, the elevator car must be moved in the opposite direction. Movement of the elevator car in the opposite direction allows tire 20 to roll in the direction opposite of the direction it was rolling during the overspeed that caused rotary actuator 10 to trigger and engage the elevator safeties. Once tire 20 begins to roll in the opposite direction, counterweights 12 become "unwedged" from inner wall 36 and the spring 34 is released thereby biasing one counterweight 12 (directly) back into its pre-pivot position. As the first counterweight 12 returns to its pre-pivot position, connecting rod 16 moves and pulls second counterweight 12 back into its pre-pivot position. Both counterweights 12 are unwedged, and inner wall 36 of clutch housing 22 is disengaged and moves freely relative to base plate 14. This movement in the opposite direction also disengages the elevator safeties.

Figure 7:
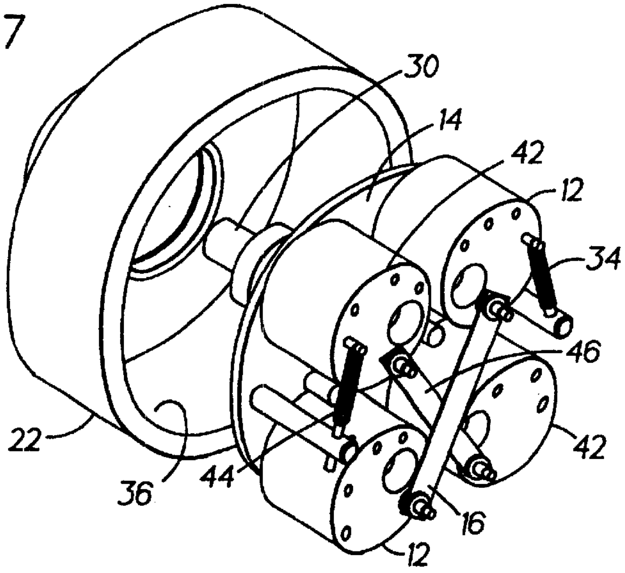
FIG. 7 is an exploded view of an alternate embodiment of the rotary actuator showing two sets of counterweights on a base plate as they would be fitted inside a housing.

One pair of counterweights 12 is arranged so that it can halt the elevator car from either the ascent or the descent. A second pair of counterweights 42 can also be pivotally connected to each end of a second connecting rod 46 and mounted on base plate 14 as shown in FIG. 7. The second pair of counterweights 42 is configured to fit around the first set of counterweights 12 and inside clutch housing 22. The second pair of counterweights has the same properties and dimensions as the first pair of counterweights 12, but the configuration of the individual weights on base plate 14 is "backwards". In other words, counterweights 42 are mounted in such a way that the rolling of tire 20 in the same direction that caused first set of counterweights 12 to actuate and engage inner wall 36 of clutch housing 22 does not allow counterweights 42 to wedge against clutch housing 22. This is because the angle defined by a line extending from the contact point of counterweight 42 and housing 22 and pivot 40 and a radial line passing through the contact point is not proper for counterweights 42 to wedge in this direction. Tire 20 turns in the same direction that a second spring 44 is biased; therefore, the second set of counterweights 42 will never be actuated. In order to actuate the second set of counterweights 42, tire 20 must turn in the opposite direction. For example, previously if the elevator was descending, an overspeed would cause the first set of counterweights 12 to pivot and engage inner wall 36 of clutch housing 22. Now, the elevator would have to ascend and overspeed to cause the second set of counterweights 42 to pivot and engage inner wall 36 of clutch housing 22.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims.

What is claimed is:

1. A rotary actuated overspeed safety device comprising:

a rotatable wheel;

a base having a facing in a parallel planar relationship with and fixedly connected to the wheel;

a first pair of counterweights pivotally mounted to the face and driven by rotation of the rotatable wheel to orbit a longitudinal axis, both of the counterweights of the first pair of counterweights being actuated centrifugally when the rotatable wheel rotates in a first direction exceeding a first predetermined rotational speed;

a second pair of counterweights pivotally mounted to the face and driven by rotation of the rotatable wheel to orbit the longitudinal axis, both of the counterweights of the second pair of counterweights being actuated centrifugally when the rotatable wheel rotates in a second direction exceeding a second predetermined rotational speed; and a movable clutch housing juxtaposed with and alternately engageable by each of the first and second pairs of counterweights.

2. The rotary actuated overspeed safety device according to claim 1, further comprising:

a first connecting rod pivotally connected to both of the counterweights of the first pair of counterweights enabling the first pair of counterweights to be actuated centrifugally in unison; and a second connecting rod pivotally connected to both of the counterweights of the second pair of counterweights enabling the second pair of counterweights to be actuated centrifugally in unison.

3. The rotary actuated overspeed safety device according to claim 2, wherein at least one counterweight of each pair of counterweights is spring-biased against centrifugal actuation.

4. The overspeed safety device according to claim 1, further comprising bearings interposed between the base and the clutch housing.

5. The overspeed safety device according to claim 1, further comprising low-friction bushings interposed between the counterweights and the base.

6. The overspeed safety device according to claim 5, wherein the low-friction bushings are made of polytetrafluoroethane.

7. The overspeed safety device according to claim 1, wherein the rotatable wheel is adapted to engage and roll along a guide rail.

8. The rotary actuated overspeed safety device of claim 1, further comprising a tire mounted on the wheel.

* * * * *